United States Patent
Kline

(10) Patent No.: US 6,496,104 B2
(45) Date of Patent: Dec. 17, 2002

(54) SYSTEM AND METHOD FOR COMMUNICATION VIA POWER LINES USING ULTRA-SHORT PULSES

(75) Inventor: Paul A. Kline, Gaithersburg, MD (US)

(73) Assignee: Current Technologies, L.L.C., Germantown, MD (US)

(*) Notice: Subject to any disclaimer, the term of this patent is extended or adjusted under 35 U.S.C. 154(b) by 0 days.

(21) Appl. No.: 09/805,638

(22) Filed: Mar. 14, 2001

(65) Prior Publication Data

US 2002/0024423 A1 Feb. 28, 2002

Related U.S. Application Data

(60) Provisional application No. 60/189,341, filed on Mar. 15, 2000.

(51) Int. Cl.$^7$ ............................................. H04M 11/04
(52) U.S. Cl. ........................... 340/310.01; 340/310.07; 307/18
(58) Field of Search ................. 340/310.01, 310.02, 340/310.03, 310.04, 310.07; 307/18, 40, 125

(56) References Cited

U.S. PATENT DOCUMENTS

| | | | |
|---|---|---|---|
| 3,895,370 A | 7/1975 | Valentini | 340/310 |
| 3,911,415 A | 10/1975 | Whyte | 340/310 |
| 3,942,168 A | 3/1976 | Whyte | 340/310.01 |
| 3,942,170 A | 3/1976 | Whyte | 340/310 |
| 3,967,264 A | 6/1976 | Whyte et al. | 340/310.08 |
| 4,012,733 A | 3/1977 | Whyte | 340/310 |
| 4,070,572 A | 1/1978 | Summerhayes | 250/199 |
| 4,119,948 A | 10/1978 | Ward et al. | 340/870.02 |
| 4,142,178 A | 2/1979 | Whyte et al. | 340/310 |
| 4,268,818 A | 5/1981 | Davis et al. | 340/870.38 |

(List continued on next page.)

FOREIGN PATENT DOCUMENTS

| | | |
|---|---|---|
| DE | 197 28 270 A1 | 1/1999 |
| EP | 0 913 955 A2 | 5/1999 |
| EP | 0 948 143 A2 | 10/1999 |
| EP | 0 959 569 A1 | 11/1999 |
| ES | 2 122 920 A1 | 12/1998 |
| GB | 2 335 335 A | 9/1999 |
| GB | 2 341 776 A | 3/2000 |
| WO | 98/01905 A1 | 1/1998 |
| WO | 98/33258 A3 | 7/1998 |
| WO | 98/33258 A2 | 7/1998 |
| WO | 01/08321 A1 | 2/2001 |

OTHER PUBLICATIONS

U.S. application Ser. No. 09/765,910, Jan. 19, 2001, Kline.
U.S. application Ser. No. 09/835,532, Apr. 16, 2001, Kline.
U.S. application Ser. No. 09/837,972, Apr. 19, 2001, Kline et al.
U.S. application Ser. No. 09/912,633, Jul. 25, 2001, Kline.
U.S. application Ser. No. 09/915,459, Jul. 26, 2001, Kline.
U.S. application Ser. No. 09/924,730, Aug. 08, 2001, Kline.
U.S. application Ser. No. 10/016,998, Dec. 14, 2001, Kline.
U.S. application Ser. No. 10/036,914, Dec. 12, 2001, Mollenkopf et al.
U.S. application Ser. No. 10/075,708, Feb. 14, 2002, Kline.
U.S. application Ser. No. 10/075,332, Feb. 14, 2002, Kline.

(List continued on next page.)

Primary Examiner—John Tweel
(74) Attorney, Agent, or Firm—Woodcock Washburn LLP

(57) ABSTRACT

Bipolar Gaussian pulses are utilized to modulate digital data to communicate information via standard power lines. The pulses are sent in a pulse train, at set intervals. Modulation is accomplished without use of a sinusoidal wave as a carrier. Data is transmitted via power lines while reducing the amount of radiated emissions, enhancing data security, and mitigating interference from other sources. Channel capacity is also maximized by channelization in code space.

7 Claims, 5 Drawing Sheets

U.S. PATENT DOCUMENTS

| | | | |
|---|---|---|---|
| 4,433,284 A | 2/1984 | Perkins | 323/361 |
| 4,468,792 A | 8/1984 | Baker et al. | |
| 4,473,816 A | 9/1984 | Perkins | 340/310 |
| 4,473,817 A | 9/1984 | Perkins | 340/310 |
| 4,481,501 A | 11/1984 | Perkins | 340/310 |
| 4,495,386 A | 1/1985 | Brown et al. | 455/402 |
| 4,642,607 A | 2/1987 | Strom et al. | 340/310 |
| 4,644,321 A | 2/1987 | Kennon | 340/310 A |
| 4,686,641 A | 8/1987 | Evans | 364/580 |
| 4,749,992 A | 6/1988 | Fitzmeyer et al. | 340/870.02 |
| 4,785,195 A * | 11/1988 | Rochelle et al. | 307/18 |
| 4,835,517 A * | 5/1989 | Gracht et al. | 340/310.07 |
| 4,979,183 A | 12/1990 | Cowart | |
| 5,006,846 A | 4/1991 | Granville et al. | 340/870.28 |
| 5,191,467 A | 3/1993 | Kapany et al. | 359/341 |
| 5,210,519 A | 5/1993 | Moore | 340/310 |
| 5,319,634 A | 6/1994 | Bartholomew et al. | 370/18 |
| 5,351,272 A | 9/1994 | Abraham | 375/38 |
| 5,359,625 A | 10/1994 | Vander Mey et al. | |
| 5,375,141 A | 12/1994 | Takahashi | |
| 5,432,841 A | 7/1995 | Rimer | 455/457 |
| 5,448,229 A | 9/1995 | Lee, Jr. | 340/870.02 |
| 5,461,629 A | 10/1995 | Sutterlin et al. | |
| 4,749,992 A | 6/1996 | Fitzmeyer et al. | 340/870.02 |
| 5,579,335 A | 11/1996 | Sutterlin et al. | |
| 5,625,863 A | 4/1997 | Abraham | 455/3.3 |
| 5,630,204 A | 5/1997 | Hylton et al. | 455/3.3 |
| 5,640,416 A | 6/1997 | Chalmers | |
| 5,664,002 A | 9/1997 | Skinner, Sr. | 379/56.2 |
| 5,694,108 A | 12/1997 | Shuey | 340/310.01 |
| 5,717,685 A | 2/1998 | Abraham | 370/30 |
| 5,748,671 A | 5/1998 | Sutterlin et al. | |
| 5,770,996 A | 6/1998 | Severson et al. | 340/310.08 |
| 5,774,526 A | 6/1998 | Propp et al. | 379/90.1 |
| 5,777,544 A | 7/1998 | Vander Mey et al. | |
| 5,777,769 A | 7/1998 | Coutinho | 359/173 |
| 5,778,116 A | 7/1998 | Tomich | 385/16 |
| 5,802,102 A | 9/1998 | Davidovici | |
| 5,818,127 A | 10/1998 | Abraham | 307/106 |
| 5,847,447 A | 12/1998 | Rozin et al. | 257/678 |
| 5,864,284 A | 1/1999 | Sanderson et al. | 340/310.01 |
| 5,880,677 A | 3/1999 | Lestician | 340/825.06 |
| 5,881,098 A | 3/1999 | Tzou | |
| 5,929,750 A | 7/1999 | Brown | 340/310.02 |
| 5,937,003 A | 8/1999 | Sutterlin et al. | |
| 5,937,342 A | 8/1999 | Kline | 455/402 |
| 5,949,327 A | 9/1999 | Brown | 340/310.01 |
| 5,963,585 A | 10/1999 | Omura et al. | |
| 5,977,650 A | 11/1999 | Rickard et al. | 307/3 |
| 6,014,386 A | 1/2000 | Abraham | 370/485 |
| 6,037,678 A | 3/2000 | Rickard | 307/89 |
| 6,040,759 A | 3/2000 | Sanderson | 340/310.01 |
| 6,226,166 B1 | 5/2001 | Gumley et al. | 361/118 |
| 6,282,405 B1 | 8/2001 | Brown | 725/79 |
| 6,297,729 B1 | 10/2001 | Abali et al. | 340/310.01 |
| 2002/0027496 A1 | 3/2002 | Cern et al. | 340/310.01 |

OTHER PUBLICATIONS

U.S. application Ser. No. 10/150,694, May 16, 2002, Gidge.
U.S. application Ser. No. 10/165,992, Jun. 10, 2002, Kline.
U.S. application Ser. No. 10/176,500, Jun. 21, 2002, Pridmore, Jr. et al.
Patent Absracts of Japan, Japanese Publication No. 10200544 A2, published Jul. 31, 1998, (Matsushita Electric Works, Ltd.).
Web Printout: http://www.tohoku–epco.co.jp/profil/kurozu/c vol8 1/art04.htm Tohoku Electric Power, Co., Inc., "Tohoku Electric Develops High–Speed Communications System Using Power Distribution Lines," *Tohoku Currents*, Spring 1998, 8(1), 2 pages.
International Search Report issued in PCT Application No. PCT/US01/01810, Date of Mailing: May 2, 2001.
International Search Report issued in PCT Application No. PCT/US01/12699, Date of Mailing: Jul. 16, 2001.
International Search Report issued in PCT Application No. PCT/US01/12291, Date of Mailing: Oct. 22, 2001.
International Search Report issued in PCT Application No. PCT/US01/48064, Date of Mailing: Jun. 5, 2002.
Written Opinion issued in PCT Application No. PCT/US01/12699, Date of Mailing: May 15, 2002.

* cited by examiner

SYSTEM AND METHOD FOR COMMUNICATION VIA POWER LINES USING ULTRA-SHORT PULSES

CROSS REFERENCE TO RELATED APPLICATIONS

This application claims priority under 35 U.S.C. § 119(e) from provisional patent application No. 60/189,341, filed Mar. 15, 2000. The No. 60/189,341 application is incorporated by reference herein, in its entirety, for all purposes.

INTRODUCTION

The present invention relates generally to the field of digital communications. More particularly, the present invention relates to transmission of digital data via power transmission and distribution lines.

BACKGROUND OF THE INVENTION

The use of power lines as a communication medium is well known, dating back to efforts in the 1930's to provide telephone communication to rural areas. More recently, systems have been devised that utilize the power line as a medium to communicate data between computers. Some attempts have been made to use these systems to provide Internet access. To date traditional modulation schemes such as Frequency Shift Keying (FSK), Direct Sequence Spread Spectrum (DSSS), and Orthogonal Frequency Division Multiplexing (OFDM) have been used.

The use of chirped frequency shift keying for transmission of digital data over power lines has been proposed. For further details, refer to U.S. Pat. No. 4,468,792 to Baker et al.

The use of spread spectrum techniques for transmission of digital data via power lines has also been proposed. For further details, refer to U.S. Pat. No. 5,375,141 to Takahashi, as well as a number of patents to Sutterlin et al.: U.S. Pat. No. 5,937,003, U.S. Pat. No. 5,748,671, U.S. Pat. No. 5,579,335, and U.S. Pat. No. 5,461,629. U.S. Pat. No. 5,359,625 to Vander Mey et al. teaches the use of spread spectrum in noisy networks, such as RF channels and AC power lines.

All of these traditional modulation schemes utilize a sinusoid wave as a center carrier, and vary the amplitude and/or frequency and/or phase of that carrier so as to convey the information to be communicated.

Systems that use conventional modulation schemes for power line communications have issues such as radiated emissions, reflections, security and interference from other sources, and channel capacity.

Thus, what is needed is a way to transmit data via power lines while mitigating the above-noted problems of radiated emissions, reflections, security and interference from other sources, and channel capacity.

SUMMARY OF THE INVENTION

The present invention does not use sine waves as a carrier wave at all. Instead, bipolar Gaussian pulses are used to communicate data over standard power lines.

It is an object of the present invention to provide a signaling scheme for use in transmission of data via power lines.

It is another object of the present invention to provide a system for use in transmission of data via power lines.

It is yet another object of the present invention to provide a system for power line data transmission that minimizes radiated power.

It is still another object of the present invention to provide a system for power line data transmission that has secure transmission of data.

It is a further object of the present invention to provide a system for power line data transmission that has spectral smoothing characteristics.

It is an additional object of the present invention to provide a system for power line data transmission that makes each channel resistant to interference.

It is another object of the present invention to provide a system for power line data transmission that modulates pulses in a train of bipolar Gaussian pulses according to time position and amplitude of the pulses.

Additional objects and advantages of the present invention will be apparent in the following detailed description read in conjunction with the accompanying drawing figures.

DETAILED DESCRIPTION OF THE INVENTION

One aspect of the present invention is a method for transmitting data via power lines. The method includes encoding the data according to a pseudo noise code to form encoded data. The encoded data is then modulated utilizing a train of energy pulses and without utilizing a sinusoidal carrier signal. The modulated data is then applied to a power line transmission medium.

Another aspect of the present invention is a receiver for recovering data transmitted via an alternating voltage power line. The receiver includes a high pass filter connected to the power line to filter out the alternating voltage and provide a filtered output signal, as well as a matched filter connected to condition the filtered output signal to filter out unwanted signals and provide a conditioned output signal. A correlator is connected to receive the conditioned output signal for pulse correlation to recover an estimation signal that corresponds to symbols of the data to be recovered. The receiver also includes a delay locked loop connected to receive the estimation signal output by the correlator to recover timing information, and a pseudo noise code generator connected to receive the timing information recovered by the delay locked loop as a time base to produce a pseudo noise code output to the correlator for correlation. Position of the pseudo noise code is detected, thus enabling the delay locked loop to maintain a lock, and the correlator to output recovered symbols. A decision circuit is connected to receive the recovered symbols and to recover the data represented by the symbols.

The present invention utilizes pulses to communicate the information over standard power lines. The pulses are sent in a pulse train, at set intervals.

Figure 1:
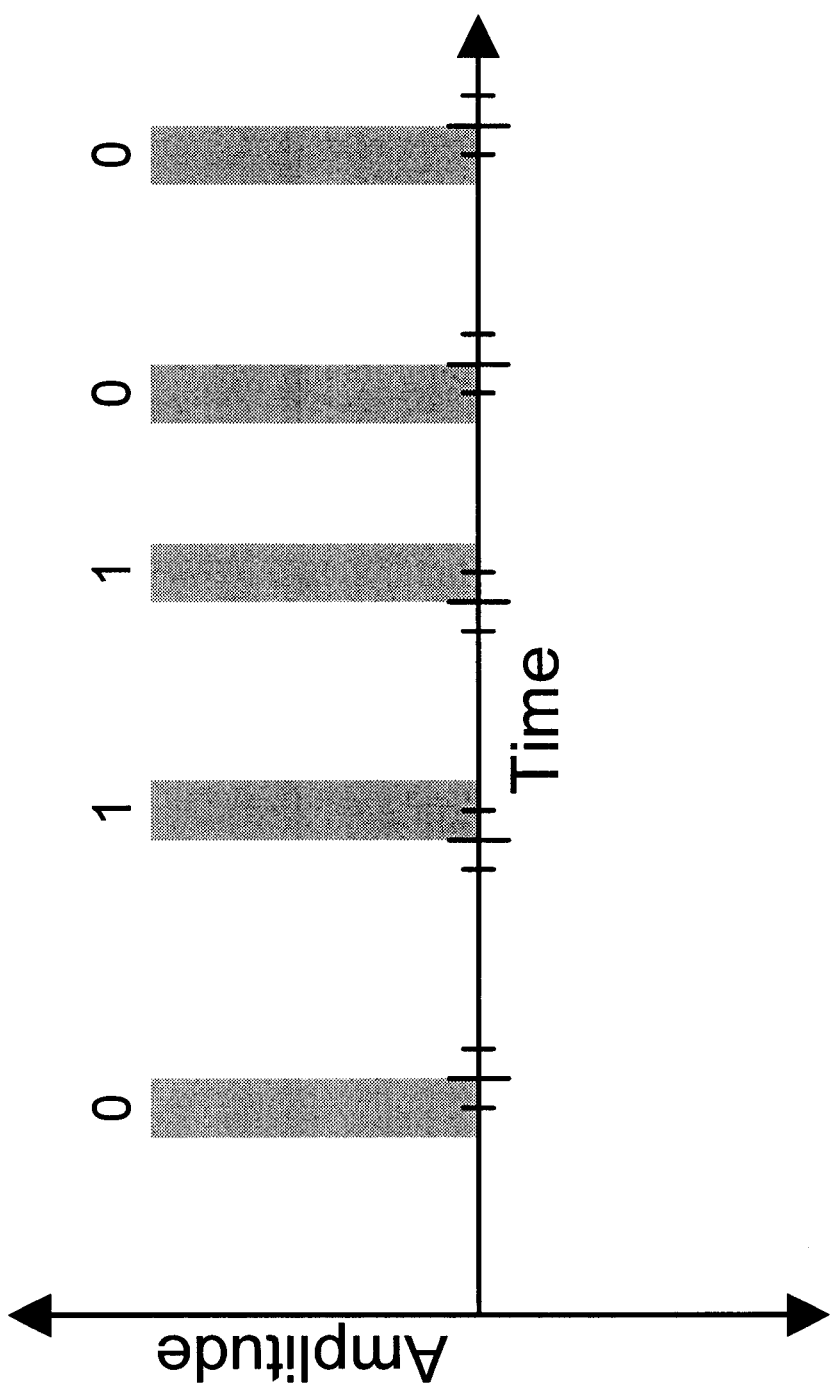
FIG. 1 illustrates an example of a pulse train subject to time position modulation.

Referring to FIG. 1, pulses in the pulse train may be shifted slightly in time to modulate them to represent either a digital bit 0 or 1. Alternately, the amplitude of the pulses in the pulse train may be changed to modulate the pulses to represent either a digital bit 0 or 1. As a further alternative, the width of the pulses in a pulse train may be modulated.

Figure 2:
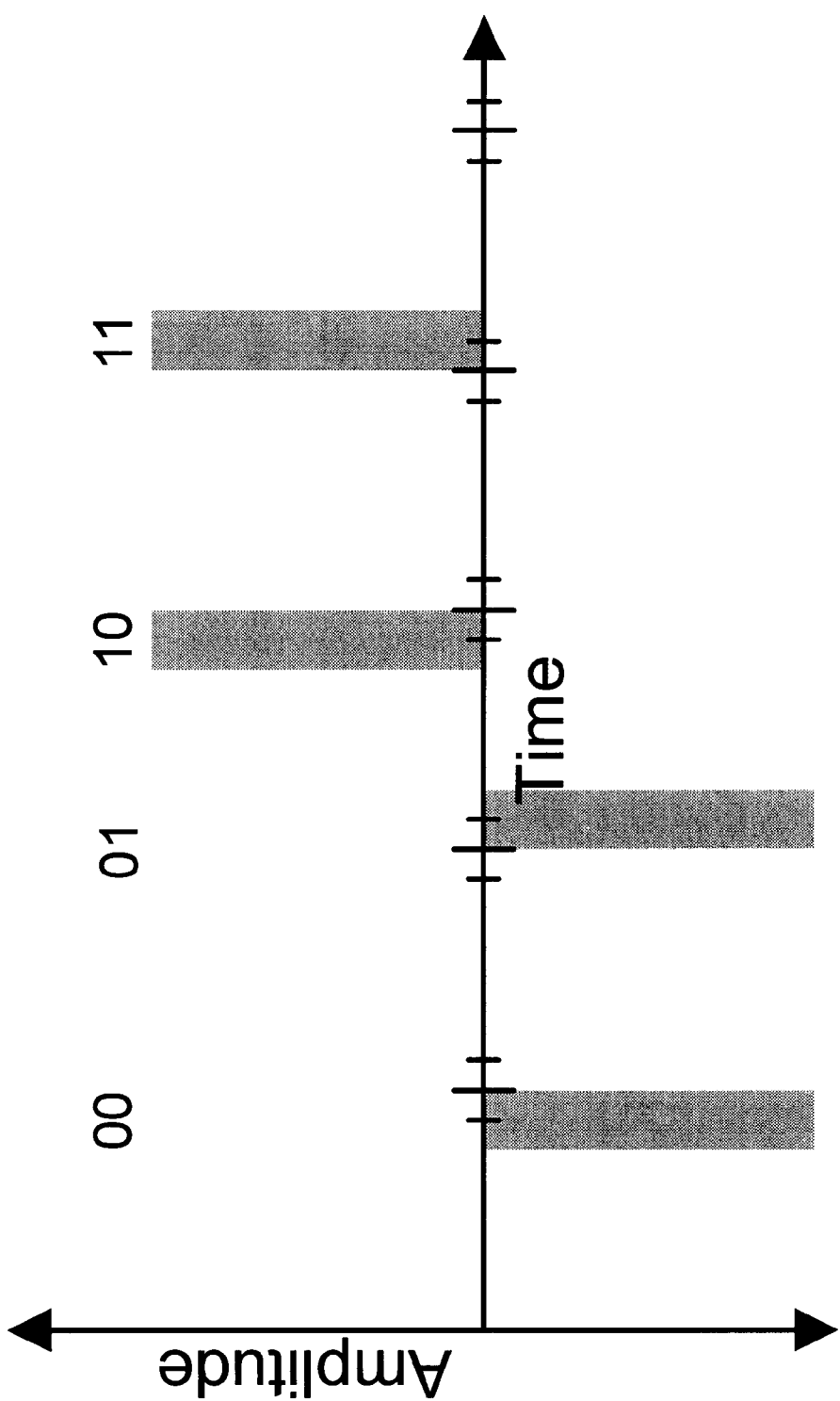
FIG. 2 illustrates an example of a pulse train subject to time position modulation and amplitude modulation.

Referring to FIG. 2, both time position and amplitude of pulses in a pulse train are modulated so that each pulse symbolizes a multi-bit symbol.

Although the present invention may be practiced using rectangular pulses similar to those shown in FIGS. 1 and 2, other types of pulse shapes, such as Gaussian pulses, are suitable for practicing the invention. Bipolar Gaussian pulses are a preferred choice for power line communications.

Figure 3:
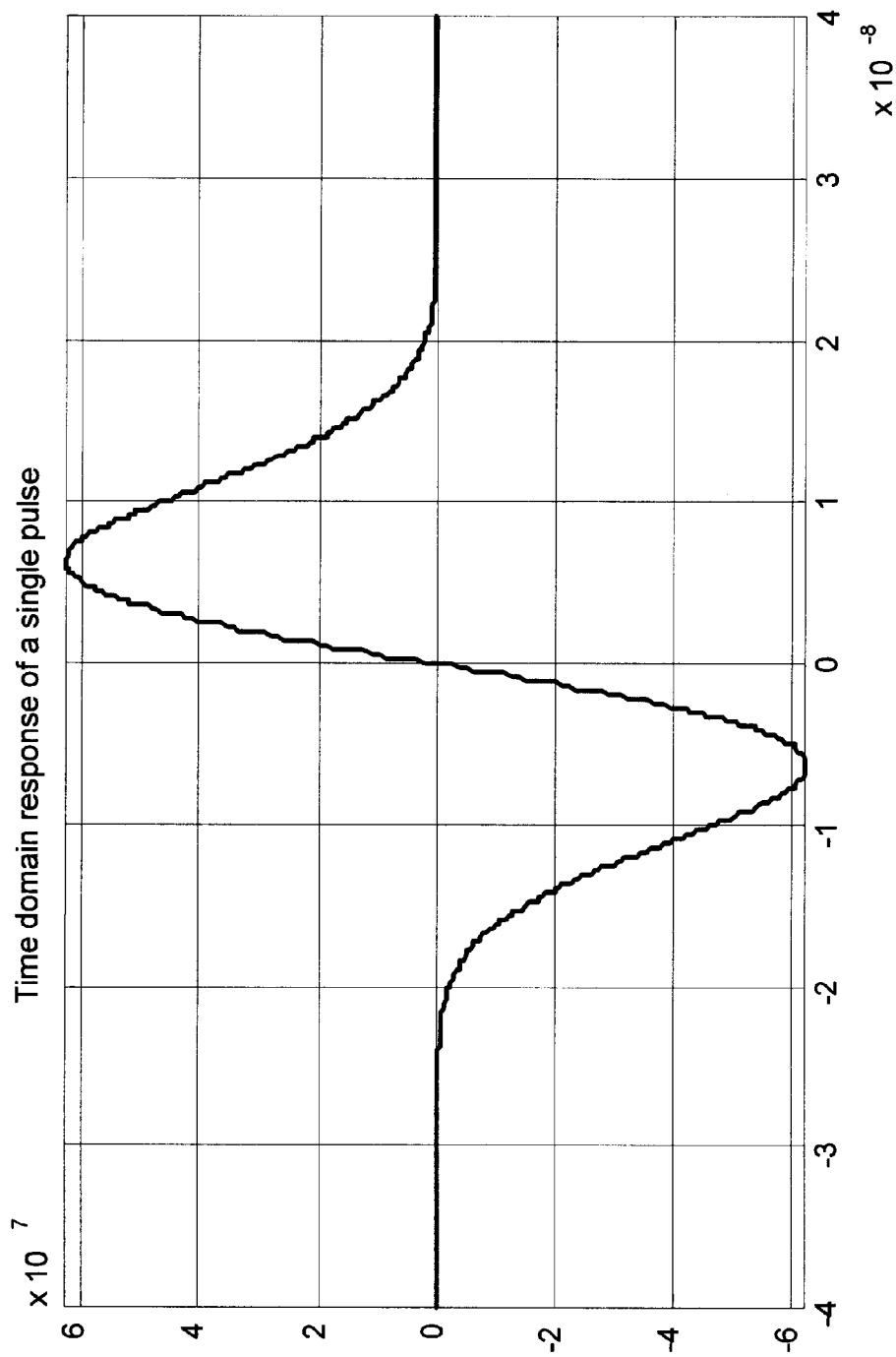
FIG. 3 illustrates a time domain representation of a single bipolar Gaussian pulse.

Referring to FIG. 3, a solitary bipolar Gaussian pulse is illustrated. A bipolar Gaussian pulse is defined mathematically as the first derivative of a Gaussian function. This type of pulse has no DC component and it is a wide-bandwidth signal.

A bipolar Gaussian pulse can be described mathematically in the time domain as:

$$f(A, t) = A\sqrt{e}\, \omega_c t e^{-\frac{(\omega_c t)^2}{2}}$$

where $\omega_c = 2\pi F_C$ ($F_C$ being the center frequency), A is the peak amplitude, and t is time.

The center frequency $F_C$ is determined by the pulse width in time denoted by $\tau$, which is the time from the positive peak to the negative peak.

$$\tau = \frac{2}{\omega_c}$$

Figure 4:
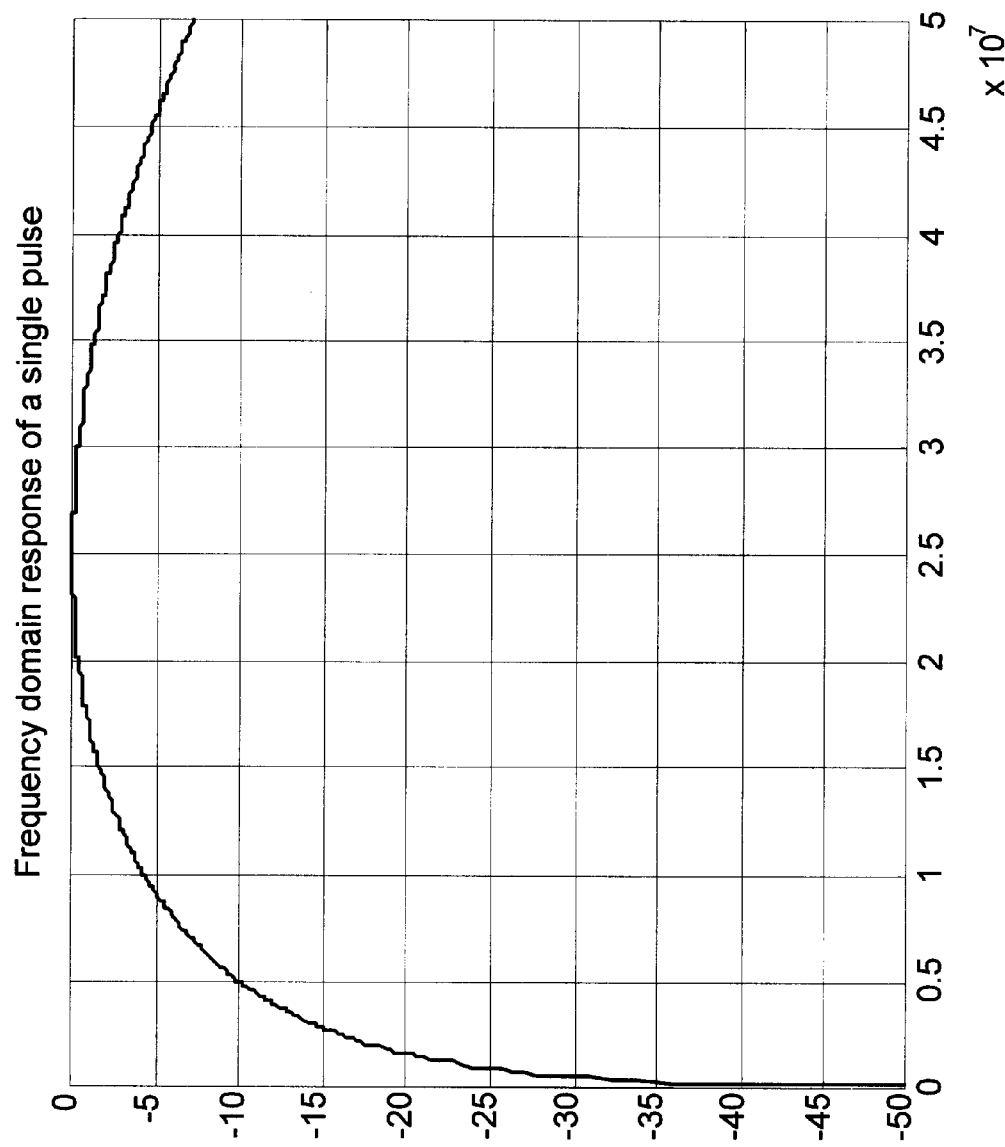
FIG. 4 illustrates a frequency domain representation of a single bipolar Gaussian pulse.

Referring to FIG. 4, a frequency domain representation of the bipolar Gaussian pulse is illustrated. The energy of the pulse is centered about the center frequency $F_C$. A bipolar Gaussian pulse may be described mathematically in the frequency domain as:

$$f(A, \omega) = -jA\sqrt{2\pi e}\, \frac{\omega}{\omega_c^2} e^{-\frac{1}{2}\left(\frac{\omega}{\omega_c}\right)^2}$$

In order to achieve a multiple access system, channelization is done in the code domain. Pseudo random (PN) codes may be used to provide such channel divisions. Using PN codes to provide channelization, each node has a PN code, and only nodes using the same PN code can decode the information transmitted by one another. This provides some measure of security, provides for spectral smoothing, and makes each channel resistant to interference.

A power line communication system using a signaling scheme according to the present invention transmits less power and, hence, will radiate less power. Thus, it produces less noise for potential interference with other electrical systems.

Another advantage of a communication system embodied according to the present invention is that problems from reflections are hardly an issue. That is because only reflections arriving at times less than a pulse width can cause inter-symbol interference (ISI) problems. This is because pulses greater that a pulse width are de-correlated by PN code de-correlation. Reflections arriving at times less than a pulse width can be easily resolved since timing between the pulses is tightly defined, in that it is known when a pulse is expected to arrive.

Immunity to interference is another advantage of this system due to processing gain. To illustrate this immunity to interference property, consider an example system with 16 users and 2 Mbps data rate per user (or 1 Meg symbols per second). To utilize the spectrum below 50 MHz on the power lines, a center frequency of 25 MHz is chosen. Hence, $\tau$=12 ns (based on the above equation) and there are 16×1 M pulses per second=16 MPPS. This system will have a processing gain of 19.2 dB. That is because the duty cycle is 19.2% (12ns×16 MPPS), thereby contributing 7.2 dB, and there are 16 codes, contributing an additional 12 dB.

Figure 5:
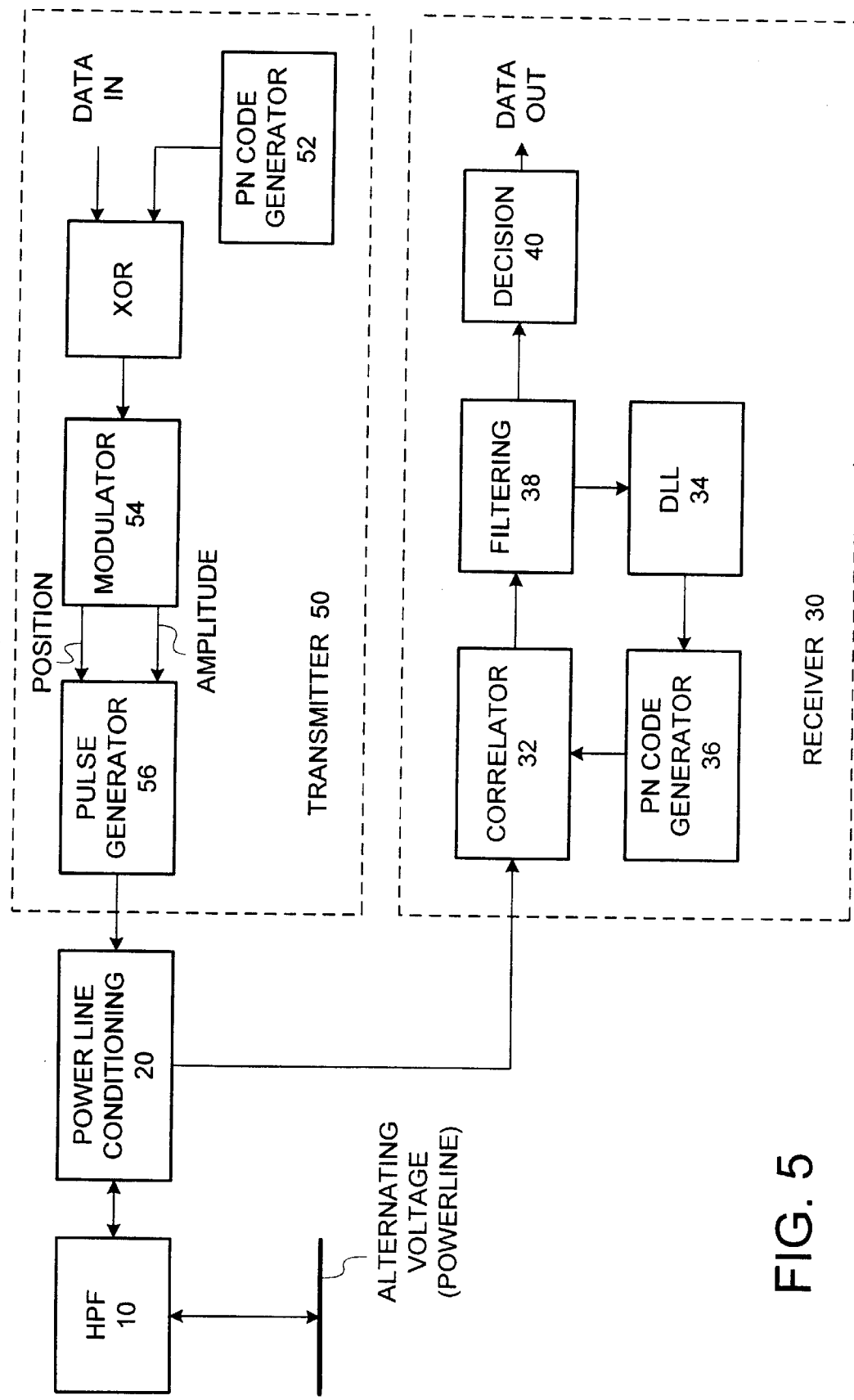
FIG. 5 illustrates a block diagram of a transceiver according to an embodiment of the present invention.

Referring to FIG. 5, a transceiver according to an embodiment of the present invention is illustrated.

On the receive side 30 of the transceiver, the alternating voltage from the power-line is filtered out at the output of the high pass filter (HPF) 10. The signal is then conditioned (for example, via a matched filter) 20 to filter out any unwanted signals. In order to recover the data, proper timing is needed. The output of the correlator 32 is fed to a delay locked loop (DLL) 34, which serves as a time base for the PN code generator 36. When the PN code position is detected on the incoming signal, the DLL 34 will stay locked and the filter 38 will output recovered symbols. These symbols are provided to the decision block 40, which in turn recovers the data.

On the transmit side 50 of the transceiver, the incoming data is coded (via an XOR) with the code from a PN code generator 52. The output is then modulated 54 for both position and amplitude as needed, which is then input into the pulse generator 56. The pulse generator 56 generates the bipolar pulses with proper position and amplitude. The final transmitted signal is placed on the power-line through the HPF 10 and line conditioning 20.

Both the receiver 30 and transmitter 50 are very economically efficient since there are no power amplifiers, IF stages, down converters, up converters, etc.

The present invention has been described in terms of preferred embodiments, however, it will be appreciated that various modifications and improvements may be made to the described embodiments without departing from the scope of the invention.

What is claimed is:

1. A method for transmitting data via power lines the method comprising:

encoding the data according to a pseudo noise code to form encoded data;

modulating the encoded data utilizing a train of energy pulses and without utilizing a sinusoidal carrier signal; and applying the modulated data to a power line transmission medium.

2. The method for transmitting data of claim 1, wherein the modulating is effected by varying time position of the pulses.

3. The method for transmitting data of claim 1, wherein the modulating is effected by varying amplitude of the pulses.

4. The method for transmitting data of claim 1, wherein the modulating is effected by varying width of the pulses.

5. The method for transmitting data of claim 1, wherein the pulses are in the form of bipolar Gaussian pulses.

6. The method for transmitting data of claim 1, wherein the modulating is effected by varying both time position and amplitude of the pulses, and wherein the pulses are in the form of bipolar Gaussian pulses.

7. A receiver for recovering data transmitted via an alternating voltage power line, the receiver comprising:

a high pass filter connected to the power line to filter out the alternating voltage and provide a filtered output signal;

a matched filter connected to condition the filtered output signal to filter out unwanted signals and provide a conditioned output signal;

a correlator connected to receive the conditioned output signal for pulse correlation to recover an estimation signal that corresponds to symbols of the data to be recovered;

a delay locked loop connected to receive the estimation signal output by the correlator to recover timing information;

a pseudo noise code generator connected to receive the timing information recovered by the delay locked loop as a time base to produce a pseudo noise code output to the correlator for correlation, wherein position of the pseudo noise code is detected, enabling the delay locked loop to maintain a lock, and the correlator outputs recovered symbols; and a decision circuit connected to receive the recovered symbols and to recover the data represented by the symbols.

* * * * *